US005581630A

United States Patent [19]

Bonneau, Jr.

[11] Patent Number: 5,581,630

[45] Date of Patent: Dec. 3, 1996

[54] PERSONAL IDENTIFICATION

[75] Inventor: Walter C. Bonneau, Jr., Missouri City, Tex.

[73] Assignee: Texas Instruments Incorporated, Dallas, Tex.

[21] Appl. No.: 615,575

[22] Filed: Mar. 12, 1996

Related U.S. Application Data

[63] Continuation of Ser. No. 472,624, Jun. 7, 1995, abandoned, which is a continuation of Ser. No. 995,653, Dec. 21, 1992, abandoned.

[51] Int. Cl.[6] .................................................. G06K 9/00

[52] U.S. Cl. ...................... 382/116; 235/380; 340/825.34

[58] Field of Search .................................. 382/115, 116, 382/119, 124, 125, 209, 218; 340/825.34; 235/380

[56] References Cited

U.S. PATENT DOCUMENTS

| | | | |
|---|---|---|---|
| 4,993,068 | 2/1991 | Piosenka et al. | 382/116 |
| 4,995,086 | 2/1991 | Lilley et al. | 382/124 |

*Primary Examiner*—Joseph Mancuso
*Attorney, Agent, or Firm*—Robert D. Marshall, Jr.; James C. Kesterson; Richard L. Donaldson

[57] ABSTRACT

A portable optical media imaging system for use in personal identification includes: a portable optical media card (13); an optical reader (34), having circuitry for reading information from the portable optical media card (13); an image scanner (30); an image system processor (31), including an encoder connected to the image scanner, and a comparator connected to the encoder and the optical reader; and transaction completion circuitry (33, 35, 36) connected to the comparator. This is also a method of personal identification verification. The method comprises: capturing a personal identification image directly from customer or operator; feeding the personal identification image into an encoder; capturing appropriate identification data from an optical media card; comparing the encoded image to the data from the optical media card; determining if the customer is true owner of the optical media credit card; and performing correct transaction. Alternatively, the method could comprise: capturing a personal identification image directly from customer or operator; capturing appropriate identification data from an optical media card; decoding the identification data from the optical media card; comparing the decoded data to the personal identification image from the customer or operator; determining if the customer is true owner of the optical media credit card; and performing correct transaction. In an alternative embodiment a microphone (101) and an audio system (102) capture voice print data for identity verification.

44 Claims, 6 Drawing Sheets

PERSONAL IDENTIFICATION

This application is a continuation of application Ser. No. 08/472,624, filed Jun. 07, 1995 now abandoned which is a continuation of application Ser. No. 07/995,653, filed Dec. 21, 1992 now abandoned.

FIELD OF THE INVENTION

This invention generally relates to the field of identity verification.

BACKGROUND OF THE INVENTION

Security of personal credit card ownership is a problem for banks, retailers, and lending institutions. There is a need for a way to verify that a person holding a credit card is actually the owner of the card. Such verification would help prevent unauthorized use of a credit card.

There is also a need to reduce the large data bases which must be maintained by retailers and banks in order to maintain personal data for each card holder such as billing addresses and credit limits. Additionally, a need exists to reduce the number of credit cards, identification papers (i.e. driver's license and social security card), and keys to buildings and machinery that each person must carry.

Such problems are overcome by the improvements afforded by this invention.

SUMMARY OF THE INVENTION

A portable optical media imaging system for use in personal identification includes: a portable optical media card; an optical reader for reading information from the portable optical media card; an image scanner; an encoder connected to the image scanner; a comparator connected to the encoder and the optical reader; and a transaction completion circuit connected to the comparator. Preferably the image scanner captures data corresponding to a physical characteristic of a person, such as finger print or palm print information, eye retina pattern data, full facial image or speech identification data such as voice print data. The portable optical media card has multiple tracks for storing and retrieving selected personal data in separate directories. The system stores data within and retrieves data from the portable optical media card.

A method of personal identification verification includes; capturing a personal identification image directly from the customer or operator; feeding the personal identification image into an encoder; retrieving corresponding identification data from an optical media card; comparing the encoded image to the data from the optical media card; determining if the customer is true owner of the optical media credit card; and performing a correct transaction.

Preferably the method could include the steps of feeding the personal identification image to a scaler to reduce image size; feeding the reduced image into an encoder; storing the encoded information on the optical media card; and retrieving personal information from the optical media card such as access rights if it has been determined that the customer is the true owner of the optical media card. The personal identification data captured directly from the customer could be a finger print, palm print, eye retina pattern print, full facial image, or a voice print.

The invention advantageously provides a manner for storing personal information in the size, shape and mobility of the credit card. Since the information for many credit cards and access to various points of entry (i.e., car, home, television, telephone, etc) can be stored on one portable optical card media the need to carry many keys and credit cards or other information papers (such as a driver's license) is reduced or eliminated. The portable optical media card allows secured access to the car, home, telephone, secured areas at the work place, etc.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
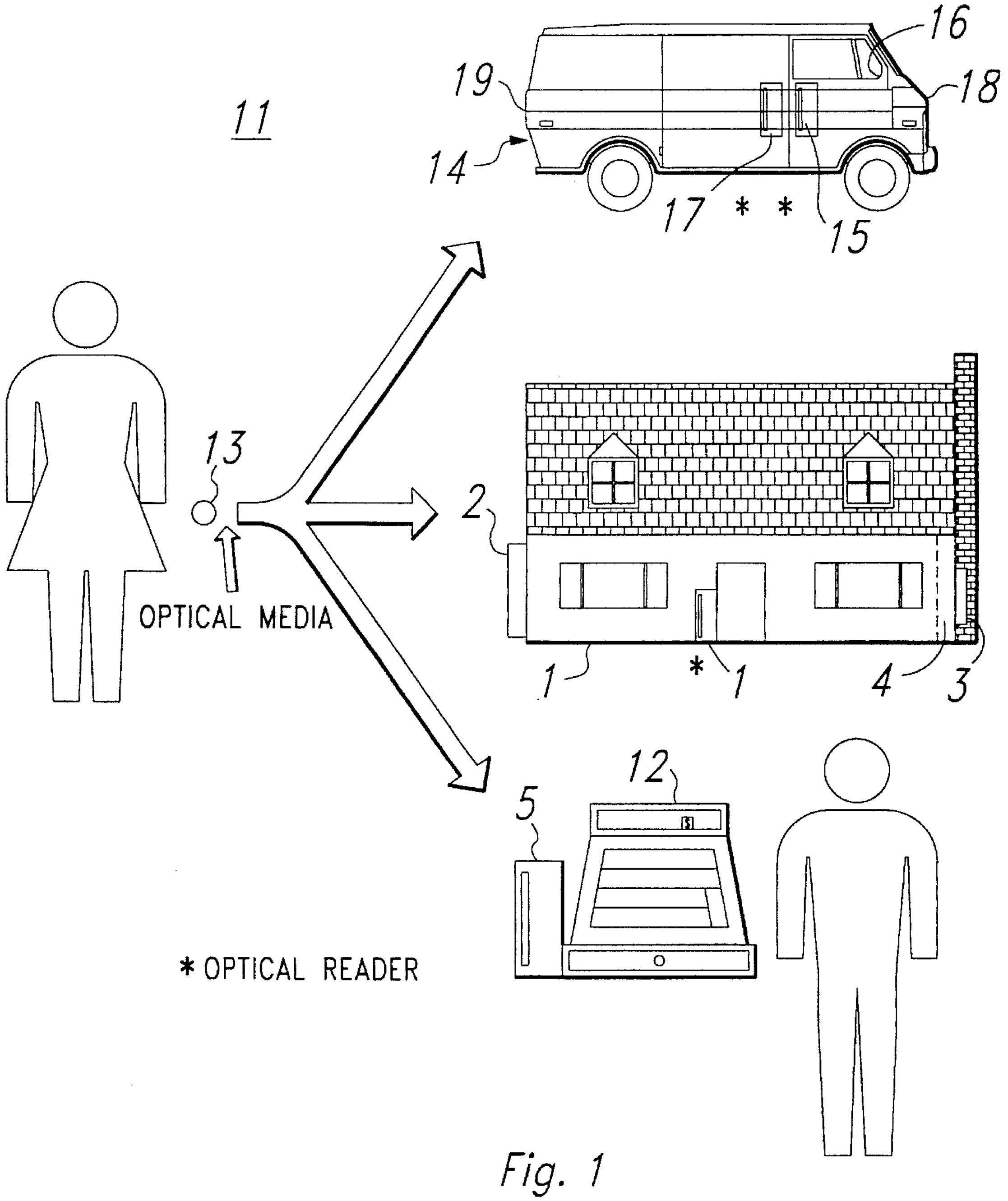
FIG. 1 is a diagram illustrating examples of the use of a optical media image system of this invention.

In FIG. 1, an optical media system 11, for daily activities provides users with an optical media card 13, personalized for use in an automobile 14, house 10, and at a store's point of sale 12.

In automobile 14, media sensors or readers may be located at any or all of the following locations: passenger door 15, ignition activation system 16, sliding door or loading door 17, engine compartment hood 18, and rear hatch or panel doors 19. In contrast to conventional key operated entry mechanisms, the optical media card 13, becomes the personalized key element in addition to or in substitution for familiar toothed keys. The media sensor is advantageously located analogously in cars, vans, recreation vehicles, motorcycles, light and heavy trucks, semi-trailer trucks, buses, trains, helicopters and airplanes, and boats and ships for entry to compartments and for activating engines or other machinery.

In the home 10 of FIG. 1, media sensors are analogously located at door 1, which is representative of front entrance, back door, patio door and other doors of swinging, sliding, multi-part, lifting and other types. Another media sensor may be provided at the garage door 2, for unlocking it and operating an automatic garage door opener. A further media sensor may be provided at utility service compartment 3, for any or all of electricity, water, fuel, and other utilities and provided at furnace and air conditioning compartment 4. Still other locations for sensor location and operation are home safe, telephone, computer and television for personalized entry to functions or programming suited to different ages or persons, closets and other rooms, swimming pool entrance, swimming pool pump or machine area, entries to outbuildings and entry gates.

Analogous media sensor locations are also desirable in apartments, hotels, offices, factories and mills, airports, docks, bridges, stations, retail and wholesale commercial establishments, and farms such as grain and truck farms, livestock farms, dairy farms, and ranches. Some applications include photocopiers, facsimile and printing equipment, pay telephones, video conferencing equipment, point of sale terminals such as registers 12, and media sensors 5, in FIG. 1. In the office and factory environment, access to various areas, machines, and assembly line locations may be suitably personalized and activated according to work group, job category, and levels of clearance. In the agricultural environment, media sensors are provided for gates, barns, elevators, silos, tractors, and planting, tillage and harvesting machines, milking machines, pumps and all other areas, devices and applications to which their advantages suit them. In the energy area, oil and gas rigs and platforms, mines and power plants are analogously fitted with media sensors.

In one important mode of use, a person whose identification data is on the optical media card 13, puts a finger on a sensor on the car door 15 while supplying optical media card 13 to be read. The current finger print data is compared with the finger print information read from optical media card 13. When a match is detected, the person is cleared for entry. Since this mode depends on a match between the person and the identification data on optical media card 13, the mere presence of the identification data image on optical media card 13, will not grant access. Thus no security breach occurs if optical media card 13 is lost or stolen.

Figure 2:
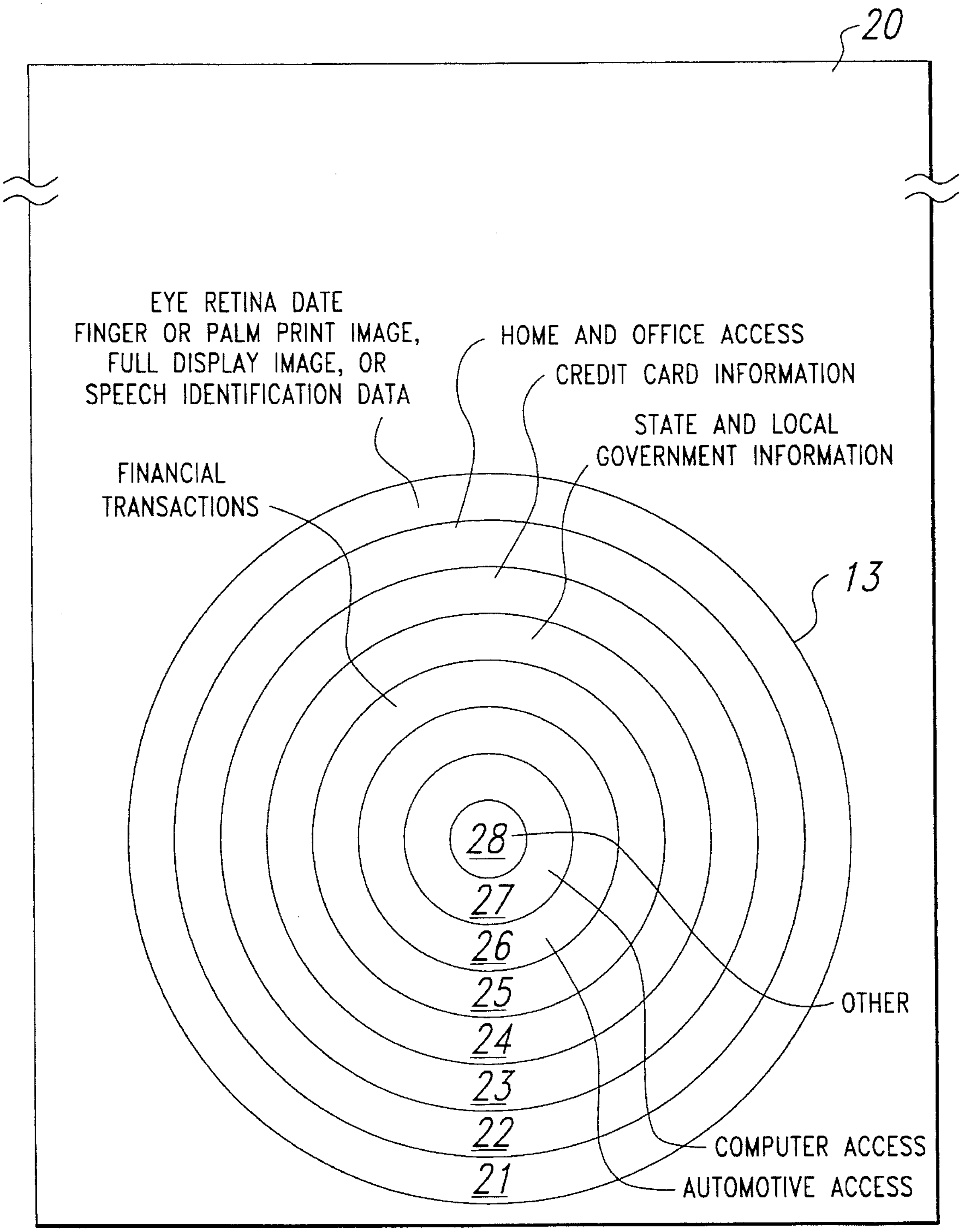
FIG. 2 is a diagram of a portable optical media card.

In FIG. 2 portable optical media card 13 contains information stored in multiple directories. The information on the optical media card 13 includes automobile access data 26, credit card information 23, financial transaction records 25, home or office entry data 22, computer access codes 27 and other facts and information 28. Optical media card 13 stores finger print data, palm print data, eye retina pattern data, full facial image data or speech identification data such as voice print data on directory 21. Portable optical media card 13 is suitably an optical CD-ROM/WORM (compact disk read only memory/write-once read memory) disk having a circular shape. In the preferred embodiment the disk has a diameter of about two inches (5.08 centimeters), however other sizes may be used. The disk can be affixed or removably included in a rectangular plastic card or otherwise carried in a convenient protective element 20. Linear storage media such as rectangular optically read media are also feasible. Media which are read by magnetic, acoustic, electric and any other suitable means are also contemplated in various embodiments.

Due to the advantageous density of storage, the optical media card 13, has ample space to hold information for many different areas of access, many credit cards, many forms of identification, and many documents.

Figure 3:
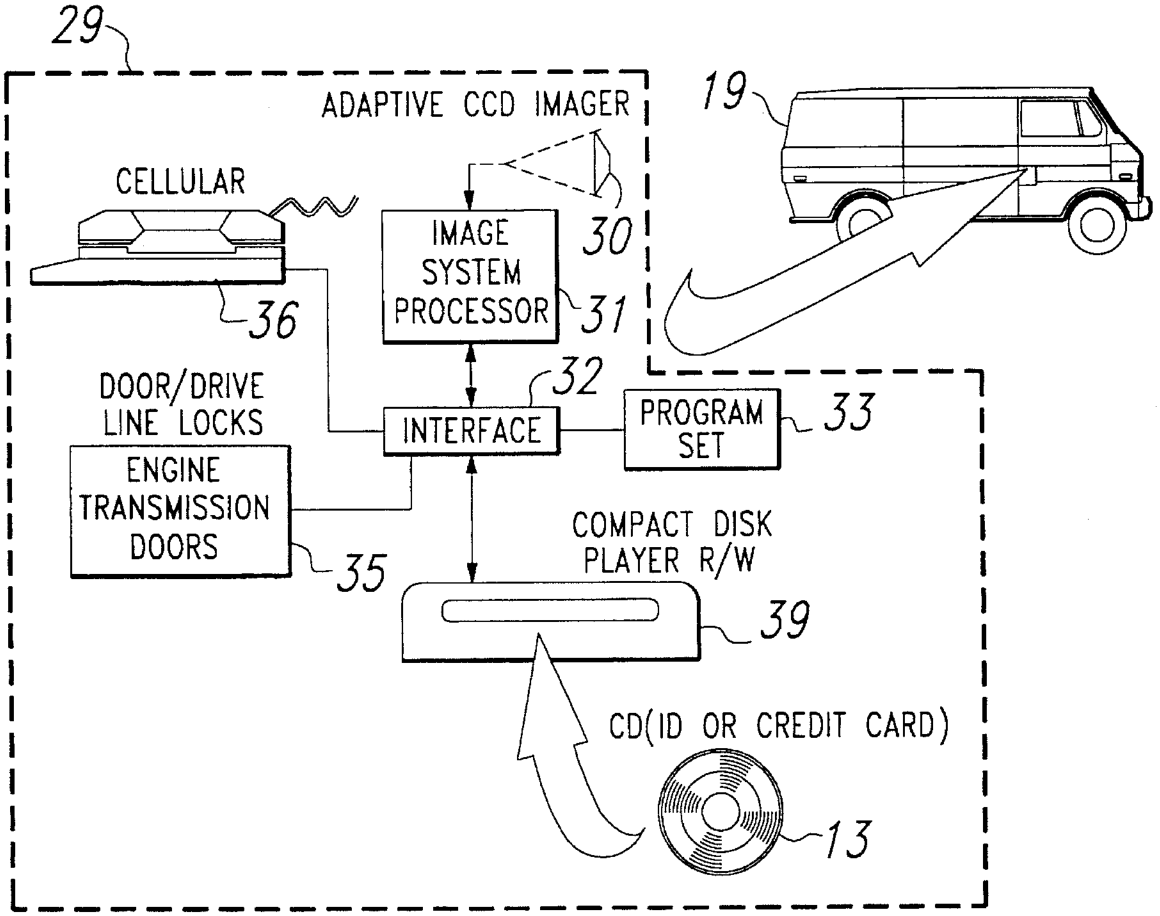
FIG. 3 is a block diagram the preferred embodiment of the optical media image system of FIG. 1.

FIG. 3 illustrates the preferred automotive imaging security system 29 for use with the portable optical media card 13. This example employs automobile 14 illustrated in FIG. 1. An image, such as a finger print, eye retina pattern or the like, is entered into the system through a camera 30, which is preferably a charge coupled device (CCD) camera. Camera 30 supplies a captured image to image system processor 31, such as the image system processor described below with respect to FIG. 4. The image system processor 31 is also connected through an interface 32 to an optical reader 34, such as a compact disk player. The optical reader 34 may read information from or write information to portable optical media card 13, such as the compact disk (CD) described hereinabove. A telephone 36, such as a cellular phone, may be connected to the interface 32 for sending information over telephone lines. For example, the automotive imaging security system 29 may telephone a security company or the police department if the image system processor 31 determines that the person seeking entry to the automobile is not authorized and therefore may be a car thief. This telephone communication may send data including the image data taken from the possible car thief to permit identification of the supposed thief. Automobile controls may also be connected to the interface 32, so that the doors unlock if image system processor 31 determines that the person seeking entry is authorized and a signal could then be sent to allow activation of the automobile engine and transmission 35. A program set 33 may also be connected to the interface 32 to facilitate the storage of information on the optical media card 13, such as authorization of another family member to use the automobile.

Figure 4:
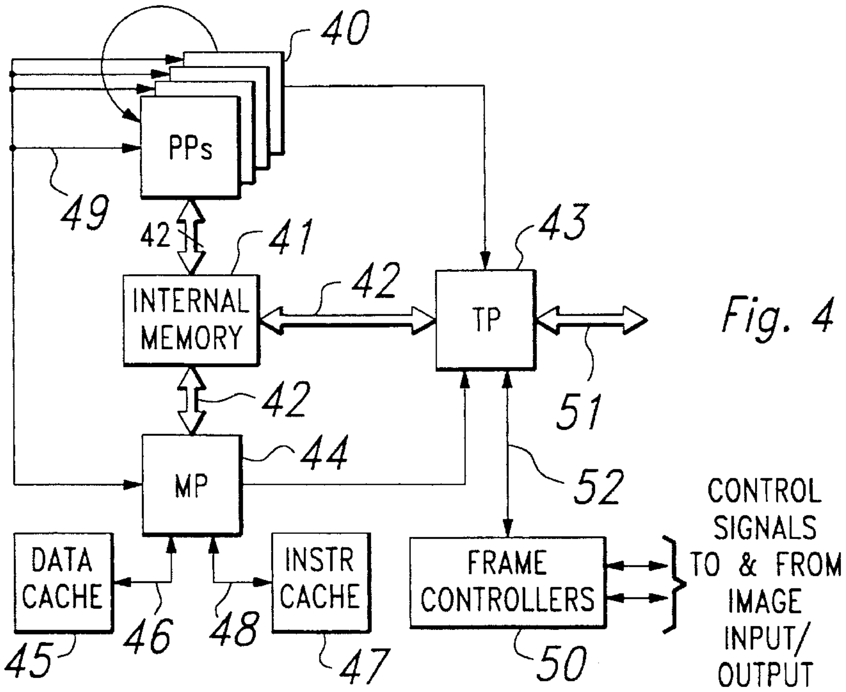
FIG. 4 is a block diagram of the image system processor of FIG. 3.

In FIG. 4 an image system processor 31 performs the algorithms, encoding, decoding, and decision making necessary for the automotive imaging security system 29 of FIG. 3. Scanning and image processing system technology is disclosed in commonly assigned U.S. Pat. application Ser. No. 933,865 filed Aug. 21, 1992 by Robert Gore et al, entitled "MULTI-PROCESSOR WITH CROSSBAR LINK OF PROCESSORS AND MEMORIES AND METHOD OF OPERATION", which is a continuation of U.S. patent application Ser. No. 435,591 filed Nov. 17, 1989 and hereby incorporated herein by reference. The image processing system 31 includes parallel processors 40 connected to internal memory 41 via crossbar switch 42, which is shown in FIG. 4 as a distributed bus. The parallel processors 40 perform optical character recognition (OCR), encoding and decoding. The encoding and decoding preferably involves a discrete cosine transformation that takes a series of pixels representing an image and averages them and compresses the image into a relatively small number of bytes. The Joint Photographic Engineering Group (JPEG) standard compression algorithm or a similar algorithm is suitable for this application. Crossbar switch 42 also connects transfer processor 43 and master processor 44 to internal memory 41. Master processor 44 is further connected to data cache 45 via bus 46 and to instruction cache 47 via bus 48. Parallel processors 40 are interconnected via communication bus 49, so that the processors can communicate with each other and with master processor 44 and with transfer processor 43. Transfer processor 43 communicates with the optical reader 34 via bus 51.

Also illustrated in FIG. 4, frame controllers 50 communicate with transfer processor 43 via bus 52. Frame controllers 50 and the master processor 44 control the optical reader 34 (FIG. 3) and serve to control image inputs and outputs through the transfer processor 43. These inputs can be, for example, the finger print or eye retina pattern image received through the camera 30, and the output can be, for example, a signal to unlock the automobile doors.

Figure 5:
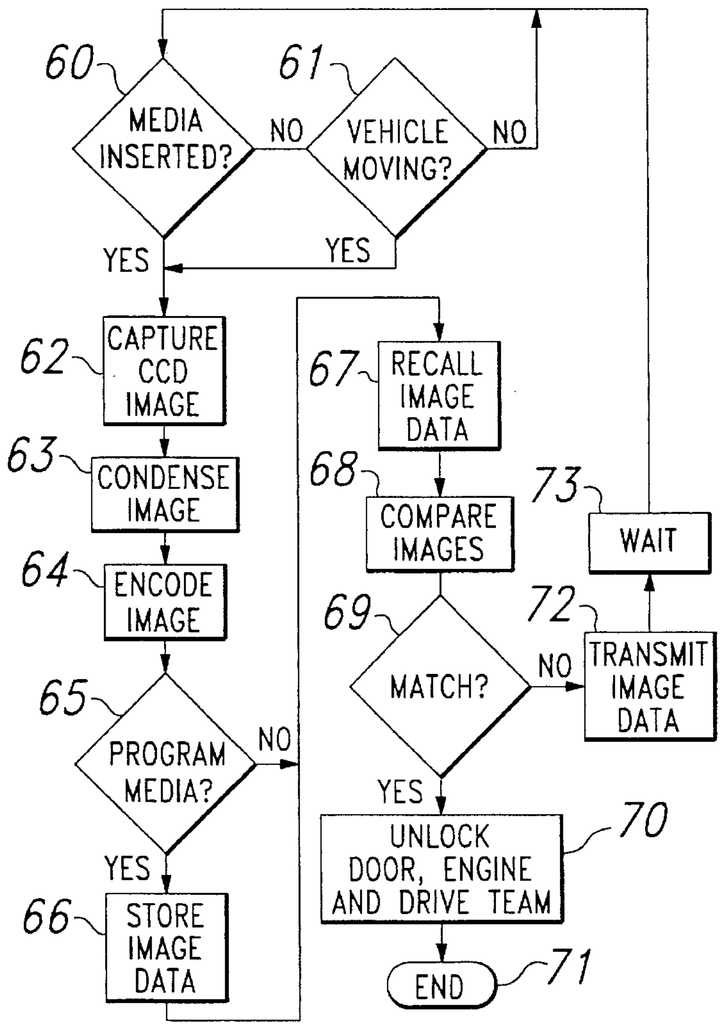
FIG. 5 is a flow diagram of the preferred method of using the optical media card image system in an automobile.

FIG. 5 illustrates steps taken in the preferred embodiment of the method discussed with respect to FIG. 3. Step 60 determines if optical reader 34 senses that an optical media card 13 has been inserted. Step 61 determines if camera 30 has detected motion of the automobile. This detected motion could result if the automobile was being stolen and driven or towed away. At step 62 an image is captured by CCD camera 30. An image divider (step 63) condenses the image by omitting unnecessary image data. In the case of a finger print image, this image division may include detecting curvatures and sporadic lines that are the distinguishing features of the finger print. The condensed image is then encoded according to an image compression algorithm (step 64), such as the JPEG format or similar image compression algorithm. The encoded image is now unrecognizable as a finger print, but more importantly the encoded image now requires less bits to describe. In an alternative embodiment the encoding step 64 is omitted and instead the sensed image data is used directly.

One option at this point is programming of the portable optical media card 13 (step 65). The encoded data may be stored in the portable optical media card 13. If the portable optical media card 13 is to be programmed (step 65), then the encoded image data is stored on the portable optical media card (step 66). This option would most probably be exercised to add another authorized user. This could occur, for example, when another family member wants to use portable optical media card 13 for access to the family automobile. To facilitate this additional access, identity data, such as the finger print data just mentioned, would be stored onto the portable optical media card 13.

In the event that programming portable optical media card 13 is not selected, then image data is recalled from portable optical media card 13 (step 67). The optical reader 34 optically and electronically senses and recognizes the information loaded onto the portable optical media card 13, from each of the tracks for which it is programmed or adapted by hardware to sense. The image data recalled from optical media card 13 is already in a compressed image format, such as the JPEG format or similar image compression format, which is unrecognizable as a finger print. Next the captured image is compared with the recalled image (step 68). Both the encoded image from the CCD camera 30 and the recalled image from portable optical media card 13 are in a compressed image format, such as the JPEG format or similar image compression format, so the images should match. A modest amount of relative displacement of the finger print in the image fields or variation in intensity and contrast does not prevent a match determination provided the images are of the same actual finger print. The critical points are compared and an algorithm computes a figure of merit or confidence in the match. If the figure of merit is sufficient in value to indicate a match (step 69), then the transaction is completed by unlocking the door, the engine and drive train (step 70). This completes the task of automotive imaging security system 29 (step 71) for this entry.

As an alternative, the recalled identity data and the just acquired physical characteristic data, such as finger print image data, are compared in uncompressed form. In this alternative, the just acquired physical characteristic data is not compressed prior to comparison. Instead the image data recalled from portable optical media card 13 is decoded and decompressed in accordance with the reverse of the encoding algorithm. The two uncompressed images are then compared to determine if the degree of correspondence exceeds the predetermined amount. Depending upon the type of data and the encoding algorithm, comparison in the compressed form or in the uncompressed form may yield more reliable results.

If the images do not match in step 69, the image captured by CCD camera 30 is transmitted through the automobile telephone 36 to a security company or the police department (step 72). This image may be the finger print of a thief or other unauthorized user of vehicle 14. After a wait of a certain period of time (step 73), the automotive imaging security system 29 returns to step 60 to determine if a portable optical media card 13 is inserted into compact disk player 34, and to step 61 to determine if there is vehicle movement.

Figure 6:
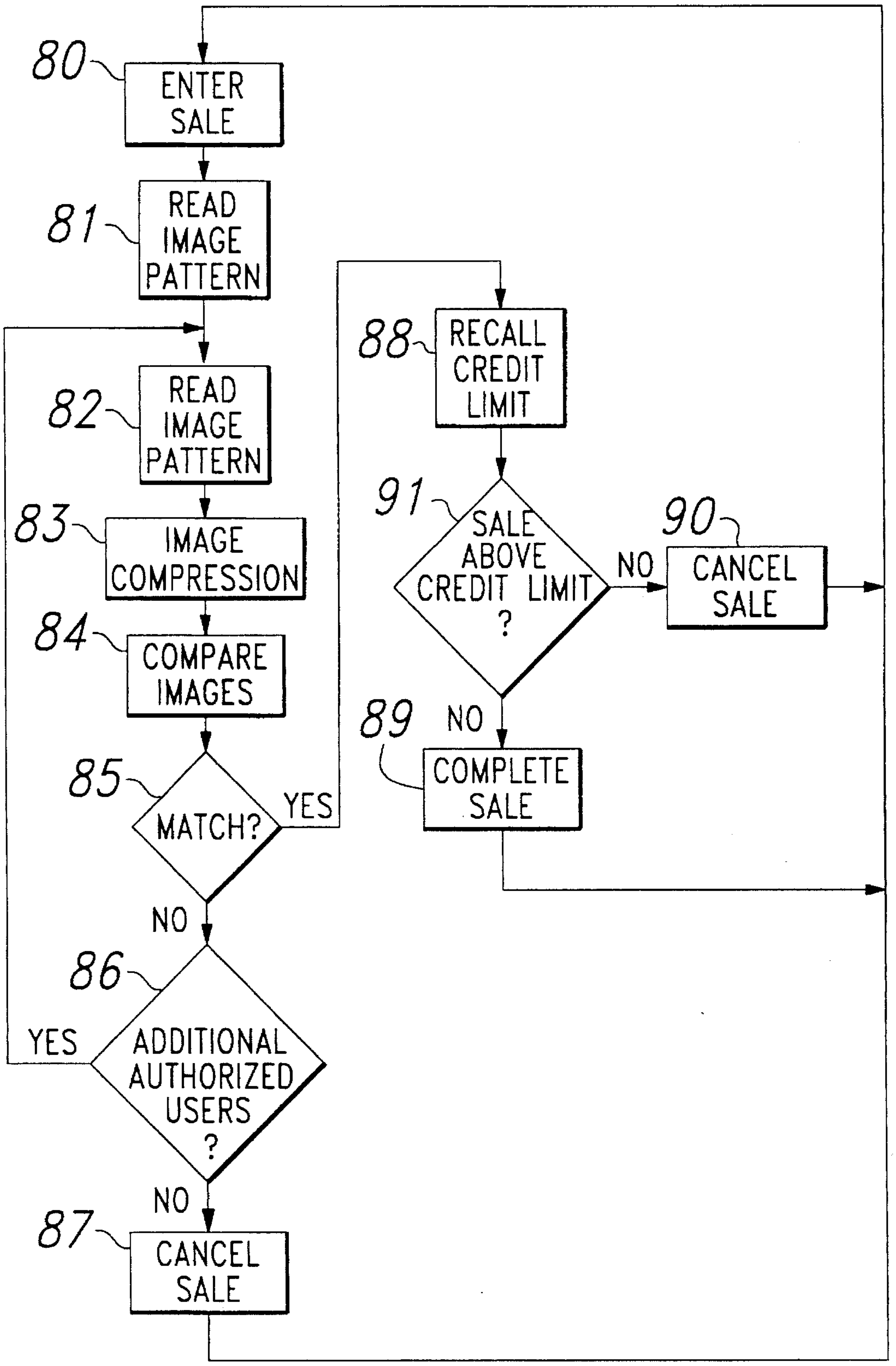
FIG. 6 is a flow diagram of a further embodiment of the optical media care image system used at the point of sale in a credit transaction.

FIG. 6 illustrates a flow diagram of another embodiment of this invention used at the point of sale of a credit transaction. The process starts by entering the sale (step 80) into the point of sale system. This entry could be by manually keying in data describing the goods and/or the price or by reading a bar code attached to the goods. The customer then looks into an imager for the eye retina pattern or places a finger on a scanner for a finger print scan (step 81). Next, the optical card media 13 is read to recall the image data (step 82). In accordance with this embodiment, optical card media 13 stores the customer's eye retina pattern data or finger print data in a compressed image format, such as the JPEG format or similar image compression format. This data is decoded (step 84) and compared with the just obtained image of the customer's eye retina pattern or finger print pattern (step 84).

In the event that the comparison fails to meet the required degree of correspondence (step 85), then the point of sale apparatus determines if optical media card 13 includes image data for another authorized customer (step 86). If there are additional authorized users, control returns to step 82 to recall the additional image. This is decoded (step 83) and compared with the recently taken image (step 84) as previously described. The process remains in this loop until either the match criteria is satisfied (step 85) or no further image data is stored on optical media card 13 (step 86). If no match is found for any authorized user, then the use is unauthorized and the sale cancelled (step 87). Thereafter control returns to step 80 for the next sale.

Upon determination that the customer is an authorized user of optical media card 13, the credit limit of that authorized user is recalled from optical media card 13 (step 88). In the case of plural authorized users, there may be a different credit limit for each user. The recalled credit limit corresponds to the authorized user whose recalled eye retina pattern data or finger print data satisfied the match criteria with the just scanned eye retina pattern or finger print. Next the sales total is compared to the credit limit (step 89). If the proposed sale is above the credit limit, the sale is cancelled (step 90). Though this customer is authorized to use this optical media card 13, this attempted purchase violates the customer's credit limit. If the proposed sale is not above the recalled credit limit, then the sale is competed (step 91). In either event control returns to step 80 to enter the next sale.

Figure 7:
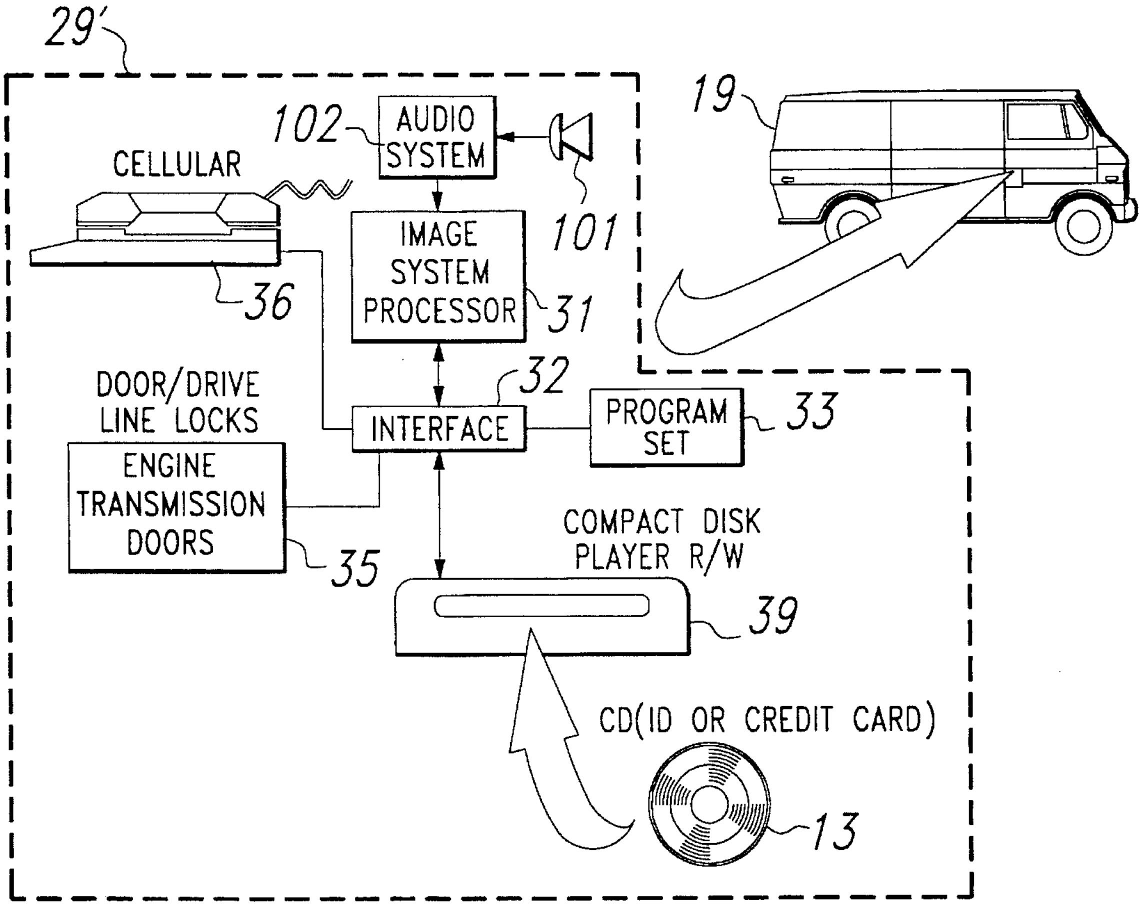
FIG. 7 is a block diagram of an alternative embodiment of the optical media image system of FIG. 1 employing speech identification data.

FIG. 7 illustrates an alternative embodiment of the automotive imaging security system 29 for use with the portable optical media card 13 illustrated in FIG. 3. This alternative embodiment is automotive voice print identification security system 29. The user inserts the portable optical media card 13 in the same manner as described in conjunction with FIG. 3. The personal characteristic used for identification is the user's voice print. The user speaks into microphone 101. Microphone 101 drives an audio system 102. Image system processor 31, such as illustrated in FIG. 4, condenses and encodes the input audio data in accordance with a voice print algorithm. Other parts of the automotive voice print identification security system 29 of FIG. 7 are the same as previously illustrated in FIG. 3.

The automotive voice print identification security system 29 illustrated in FIG. 7 is used in a manner similar to the use of the automotive imaging security system 29 illustrated in FIG. 3. The operation occurs substantially as illustrated in the flow chart of FIG. 5. At step 62 the apparatus captures the speech of the user via microphone 101, audio system 102. The speech data thus captured is then condensed (step 63) by elimination of unnecessary data for the voice print. The voice print is formed and encoded in step 64 using image system processor 31. Note that the architecture of image system processor 31 illustrated in FIG. 4 would enable formation of compressed voice prints in a manner similar to formation of compressed eye retina or finger print data. Step 67 involves recall of a stored exemplar of the user's voice print in a manner similar to that previously described. Note that the storage of image data of step 66 would involve, in this alternative embodiment, storage of compressed voice print data. In other respects this alternative embodiment operates as previously described in conjunction with FIGS. 3 and 5. One skilled in the art would also realize that with similar substitutions, voice print data could be used with the point of sale procedure illustrated in FIG. 6.

A few preferred embodiments have been described in detail hereinabove. It is to be understood that the scope of the invention also comprehends embodiments different from those described, yet within the scope of the claims.

For example, an authorized person other than the nominal card owner can use the optical media card 13, successfully if the authorized person has their own identifying data on the card in addition to the identifying data of the nominal card owner. This feature was alluded to in step 66 of FIG. 5. Thus, any member of the family can enter their home on the same card if they register different finger print images in the system. Employees of the same company can enter various areas depending on merely being an employee, or can only enter restricted areas depending on their work group and clearance information. In the credit field, different credit limits for different members of a family can additionally be encoded into the optical media card 13. Different credit card companies can have different proprietary encoding schemes for data entry on the card for security. The use of the single portable optical media card 13 obviates any need for numerous identification cards and credit cards. Suppose a person has a driver's license and wants to apply for a credit card. The driver's license information is on one track and the credit card is put on another track of the same card. Several copies of the card can be made because each one is valueless without a person in possession of the card having a physical characteristic which matches the identification data recorded on the card.

The information on the optical media card can be encrypted thereby securing the information stored on the media. Even if the media was lost it is useless without the owner accompanying it. Thus reducing the occurrence of credit card fraud. The large data bases currently maintained at retailers and banks are reduced because each person carries their information with them in the portable optical card media.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A portable personal identification system comprising:

a portable optical media card having a first physical data track having identification data corresponding to a physical characteristic of an authorized person stored therein and at least one second physical data track having selected personal data stored therein, said portable optical media card further storing additional identification data corresponding to physical characteristic of at least one additional authorized person and additional personal data corresponding to each at least one additional authorized person;

an optical reader for reading said identification data from said first physical data track of said portable optical media card and said selected personal data from a selected one of said at least one second physical data track of said portable optical media card;

an input device for capturing physical characteristic data corresponding to a physical characteristic of a person;

a comparator connected to said optical reader and said input device for determining a degree of correspondence between said identification data for said authorized person and for each additional authorized person and said physical characteristic data; and a transaction completion circuit connected to said comparator and said optical reader for permitting a transaction corresponding to said selected personal data read from said portable optical media card by said optical reader if said degree of correspondence between said identification data and said physical characteristic data for said authorized person or for any additional authorized person meets a predetermined match criteria, said transaction permitted corresponding to said selected personal data read from said portable optical media card corresponding to said authorized person or said additional authorized persons whose degree of correspondence between said identification data and said physical characteristic data meets said predetermined match criteria.

2. The portable personal identification system of claim 1, wherein:

said portable optical media card is circular and said first physical data track is disposed on the periphery of said portable optical media card.

3. The portable personal identification system of claim 2, wherein:

said at least one second physical data track are disposed concentricly on said portable optical media card.

4. The portable personal identification system of claim 1, wherein:

said identification data stored in said portable optical card media corresponds to a finger print of a person; and said input device includes an image scanner for capturing image data corresponding to a finger print of a person.

5. The portable personal identification system of claim 1, wherein:

said identification data stored in said portable optical card media corresponds to a palm print of a person; and said input device includes an image scanner for capturing image data corresponding to a finger print of a person.

6. The portable personal identification system of claim 1, wherein:

said identification data stored in said portable optical card media corresponds to an eye retinal pattern of a person; and said input device includes an image scanner for capturing image data corresponding to an eye retinal pattern of a person.

7. The portable personal identification system of claim 1, wherein:

said identification data stored in said portable optical card media corresponds to a full facial image of a person; and said input device includes an image scanner for capturing image data corresponding to a full facial image of a person.

8. The portable personal identification system of claim 1, wherein:

said identification data stored in said portable optical card media corresponds to a voice print of the speech of a person; and said input device includes a microphone and an audio system for capturing voice print data corresponding to the speech of a person.

9. The portable personal identification system of claim 1, wherein:

said transaction of said transaction completion circuit is access to a controlled space.

10. The portable personal identification system of claim 1, wherein:

said transaction of said transaction completion circuit is access to a controlled machine.

11. The portable personal identification system of claim 1, wherein:

said transaction of said transaction completion circuit is entry into a controlled process.

12. The portable personal identification system of claim 1, wherein:

said transaction of said transaction completion circuit is granting of credit.

13. The portable personal identification system of claim 12, wherein:

said transaction completion circuit permits granting of credit to the authorized person in an amount corresponding to said personal data of said authorized person if said degree of correspondence exceeds said predetermined amount.

14. A personal identification system comprising:

portable optical media card having compressed data format identification data corresponding to a physical characteristic of a plurality of authorized persons and selected personal data for each authorized person stored therein;

an optical reader for reading said identification data and said personal data from said portable optical media card;

an input device for capturing physical characteristic data corresponding to a physical characteristic of a person;

an encoder connected to said input device for encoding said physical characteristic data in said compressed data format thereby forming compressed format physical characteristic data;

a comparator connected to said input device and said optical reader for determining a degree of correspondence between said compressed format identification data for each authorized person read by said optical reader and said compressed format physical characteristic data; and a transaction completion circuit connected to said comparator for permitting a transaction if said degree of correspondence between said compressed format identification data for each authorized person and said compressed format physical characteristic data meets a predetermined match criteria, said transaction permitted corresponding to said selected personal data read from said portable optical media card corresponding to said authorized person or said additional authorized persons whose degree of correspondence between said identification data and said physical characteristic data meets said predetermined match criteria.

15. The personal identification system of claim 14, wherein:

said input device includes an image scanner for capturing image data corresponding to a finger print of a person.

16. The personal identification system of claim 14, wherein:

said input device includes an image scanner for capturing image data corresponding to palm print of a person.

17. The personal identification system of claim 14, wherein:

said input device includes an image scanner for capturing image data corresponding to an eye retinal pattern of a person.

18. The personal identification system of claim 14, wherein:

said input device includes an image scanner for capturing image data corresponding to a full facial image of a person.

19. The personal identification system of claim 14, wherein:

said input device includes a microphone and an audio system for capturing physical characteristic data corresponding to a voice print of the speech of a person.

20. The personal identification system of claim 14, wherein:

said transaction completion circuit is further connected to said optical reader for permitting a selected one of a plurality of transactions based upon personal data of an authorized person read by said optical reader if said degree of correspondence exceeds said predetermined amount.

21. The portable personal identification system of claim 14, wherein:

said transaction of said transaction completion circuit is access to a controlled space.

22. The portable personal identification system of claim 14, wherein:

said transaction of said transaction completion circuit is access to a controlled machine.

23. The portable personal identification system of claim 14, wherein:

said transaction of said transaction completion circuit is entry into a controlled process.

24. The portable personal identification system of claim 14, wherein:

said transaction of said transaction completion circuit is granting of credit.

25. The portable personal identification system of claim 24, wherein:

said transaction completion circuit permits granting of credit to an authorized person in an amount corresponding to said corresponding personal data for that authorized person read by said optical reader if said degree of correspondence exceeds said predetermined amount.

26. A portable personal identification system comprising:

a portable optical media card having identification data corresponding to a physical characteristic of a plurality of authorized persons and corresponding personal data stored therein, said identification data being encoded in a reversible compressed data format;

an optical reader for reading said identification data and said personal data from said portable optical media card;

a decoder connected to said optical reader for decoding identification data recalled from said portable optical media card from the reversible compressed data format thereby forming decoded uncompressed identification data;

an input device for capturing physical characteristic data corresponding to a physical characteristic of a person;

a comparator connected to said optical reader and said decoder for determining a degree of correspondence between said decoded uncompressed identification data for each authorized person and said physical characteristic data; and a transaction completion circuit connected to said comparator for permitting a transaction if said degree of correspondence between said compressed format identification data for each authorized person and said compressed format physical characteristic data meets a predetermined match criteria, said transaction permitted corresponding to said selected personal data read from said portable optical media card corresponding to said authorized person or said additional authorized persons whose degree of correspondence between said identification data and said physical characteristic data meets said predetermined match criteria.

27. The personal identification system of claim 26, wherein:

said input device includes an image scanner for capturing image data corresponding to a finger print of a person.

28. The personal identification system of claim 26, wherein:

said input device includes an image scanner for capturing image data corresponding to palm print of a person.

29. The personal identification system of claim 26, wherein:

said input device includes an image scanner for capturing image data corresponding to an eye retinal pattern of a person.

30. The personal identification system of claim 26, wherein:

said input device includes an image scanner for capturing image data corresponding to a full facial image of a person.

31. The personal identification system of claim 26, wherein:

said input device includes a microphone and an audio system for capturing physical characteristic data corresponding to a voice print of the speech of a person.

32. The personal identification system of claim 26, wherein:

said portable optical media card further stores selected personal data;

said optical reader further reads said personal data from said portable optical media card; and said transaction completion circuit is further connected to said optical reader for permitting a selected one of a plurality of transactions based upon personal data read by said optical data if said degree of correspondence exceeds said predetermined amount.

33. The portable personal identification system of claim 26, wherein:

said transaction of said transaction completion circuit is access to a controlled space.

34. The portable personal identification system of claim 26, wherein:

said transaction of said transaction completion circuit is access to a controlled machine.

35. The portable personal identification system of claim 26, wherein:

said transaction of said transaction completion circuit is entry into a controlled process.

36. The portable personal identification system of claim 26, wherein:

said transaction of said transaction completion circuit is granting of credit.

37. The portable personal identification system of claim 36, wherein:

said portable optical media card further stores additional compressed format identification data corresponding to a physical characteristic of at least one additional authorized person and personal data corresponding to said authorized person and personal data corresponding to each of said at least one additional authorized person;

said optical reader further reads said additional compressed format identification data and said personal data from said portable optical media card;

said comparator further determines said degree of correspondence between data for plural authorized persons read by said optical reader; and said transaction completion circuit permits granting of credit to an authorized person in an amount corresponding to said corresponding personal data for that authorized person read by said optical reader if said degree of correspondence exceeds said predetermined amount.

38. A portable personal identification system comprising:

a portable optical media card having identification data corresponding to a physical characteristic of an authorized person stored therein;

an optical reader for reading data from said portable optical media card;

an input device for capturing physical characteristic data corresponding to a physical characteristic of a person;

a comparator connected to said optical reader and said input device for determining a degree of correspondence between said identification data and said physical characteristic data;

a transaction completion circuit connected to said comparator for permitting a transaction if and only if said degree of correspondence meets a predetermined match criteria; and a transmission system for transmitting predetermined data if and only if said degree of correspondence fails to meet said predetermined match criteria.

39. The portable personal identification system of claim 38, wherein:

said predetermined data transmitted by said transmission system includes said physical characteristic data.

40. The portable personal identification system of claim 38, wherein:

said transmission system includes a cellular phone.

41. A portable personal identification system disposed in a vehicle comprising:

a portable optical media card having identification data corresponding to a physical characteristic of an authorized person stored therein;

an optical reader for detecting insertion of said portable optical media card and reading data from said portable optical media card;

an input device for capturing physical characteristic data corresponding to a physical characteristic of a person;

a motion detector for detecting if the vehicle is in motion;

a comparator connected to said optical reader and said input device for determining a degree of correspondence between said identification data and said physical characteristic data;

a transaction completion circuit connected to said comparator for permitting a operation of the vehicle if said degree of correspondence meets a predetermined match criteria; and a transmission system for transmitting predetermined data if said degree of correspondence fails to meet said predetermined match criteria or if said optical reader fails to detect insertion of said portable optical media card and said motion detector detects motion of the vehicle.

42. The portable personal identification system of claim 41, wherein:

said predetermined data transmitted by said transmission system includes said physical characteristic data.

43. The portable personal identification system of claim 41, wherein:

said transmission system includes a cellular phone.

44. The portable personal identification system of claim 41, wherein:

said input device and said motion detector include a single CCD camera.

* * * * *